Aug. 9, 1966     J. D. BIDLACK     3,264,947
DIGITAL SERVO ACTUATORS
Original Filed Nov. 17, 1961     5 Sheets-Sheet 1
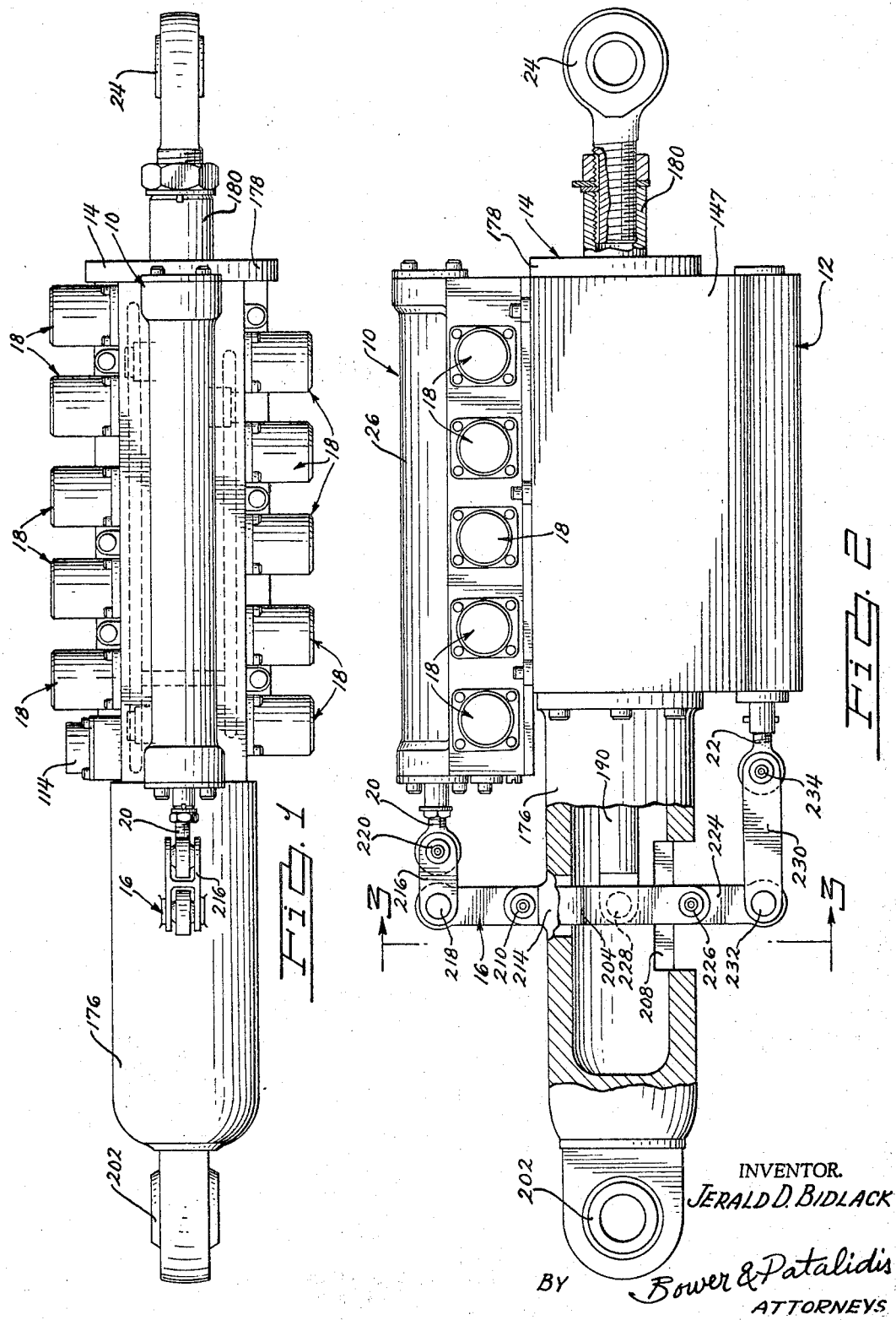
INVENTOR.
JERALD D. BIDLACK
BY Bower & Patalidis
ATTORNEYS

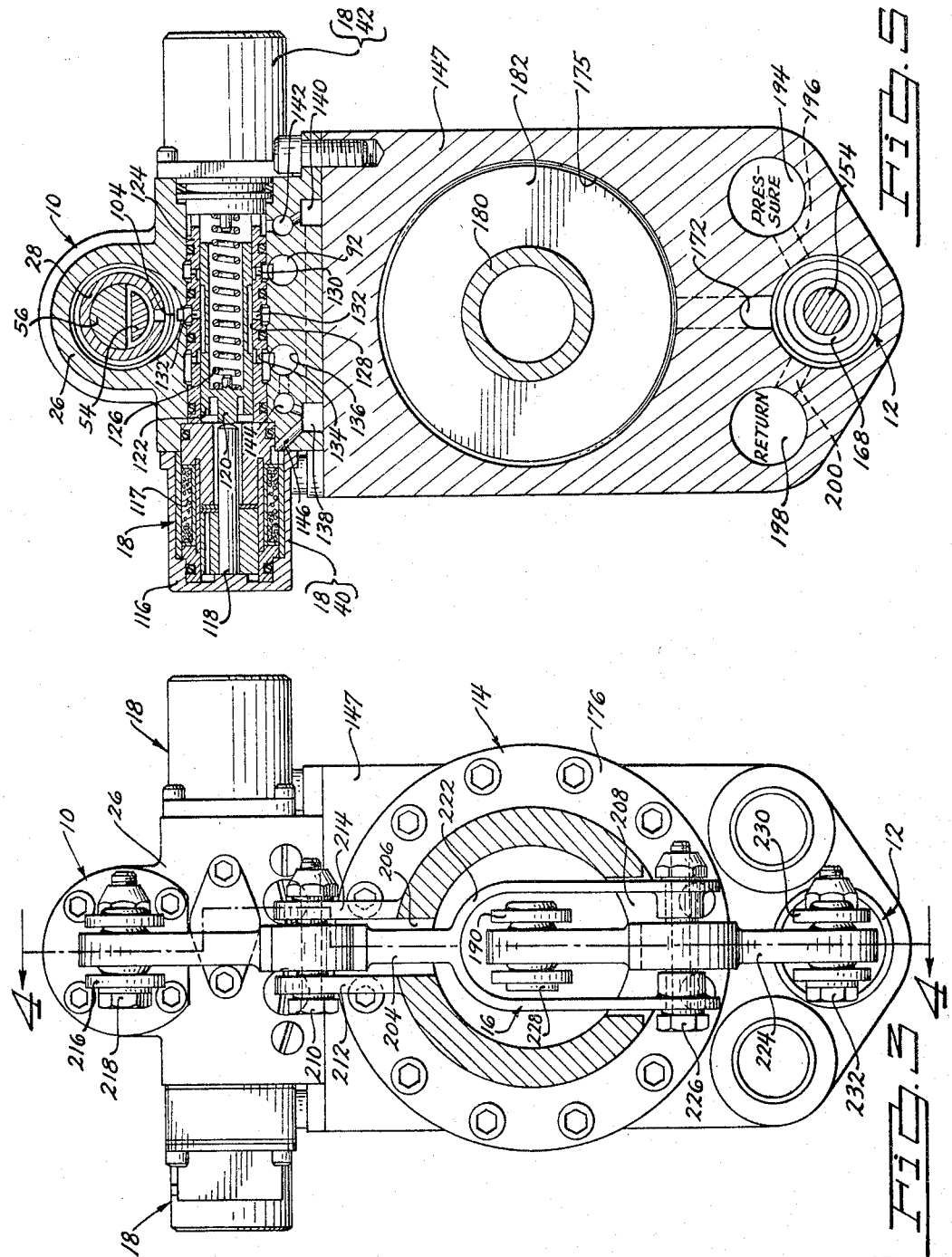

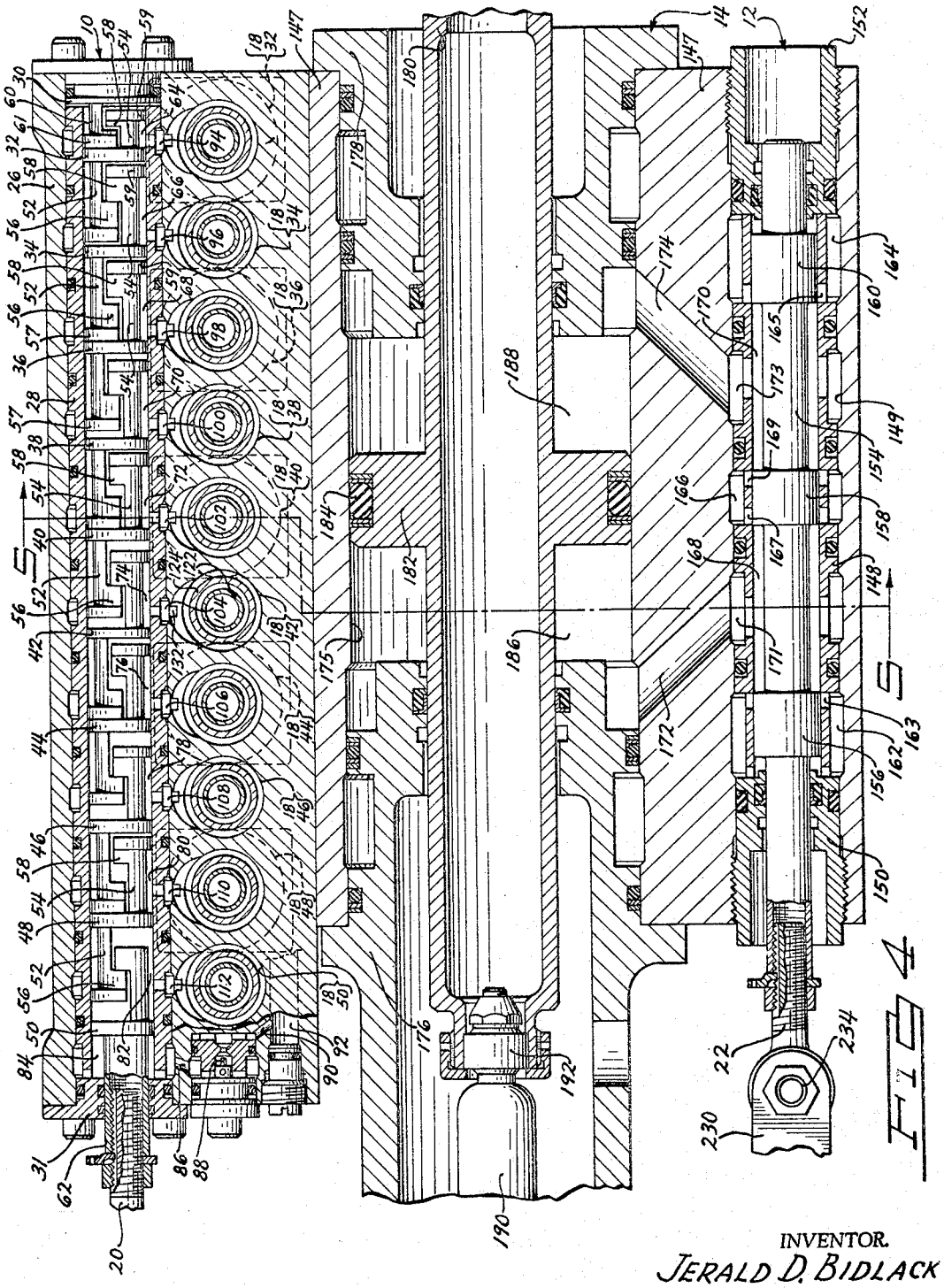

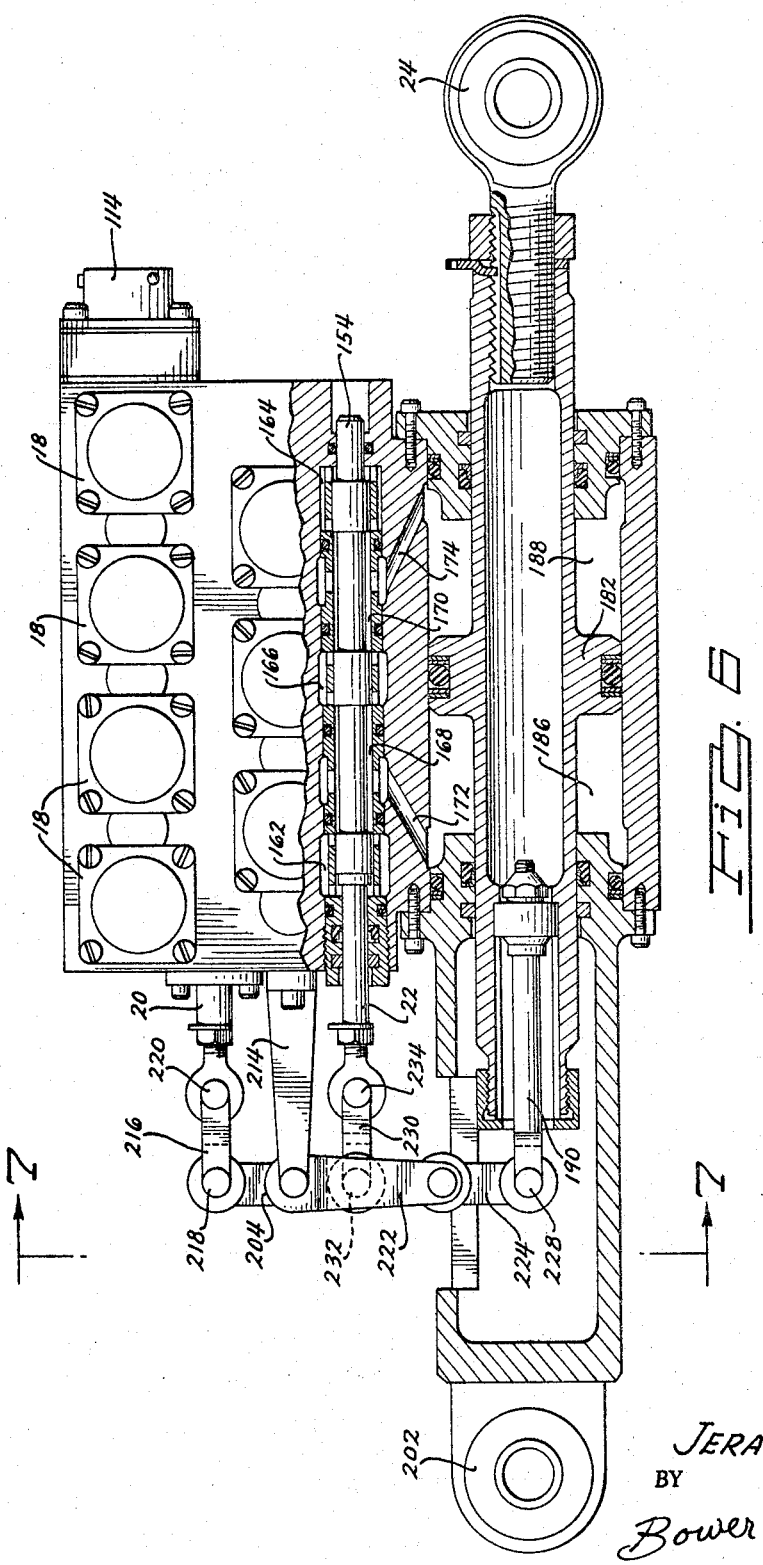

Aug. 9, 1966   J. D. BIDLACK   3,264,947
DIGITAL SERVO ACTUATORS
Original Filed Nov. 17, 1961   5 Sheets-Sheet 5

INVENTOR.
JERALD D. BIDLACK
BY
Bower & Patalidis
ATTORNEYS

United States Patent Office 3,264,947
Patented August 9, 1966

3,264,947
DIGITAL SERVO ACTUATORS
Jerald D. Bidlack, East Aurora, N.Y., assignor to Cadillac Gage Company, Roseville, Mich.
Continuation of application Ser. No. 153,076, Nov. 17, 1961. This application Aug. 26, 1964, Ser. No. 392,225
17 Claims. (Cl. 91—384)

This invention relates to improvements in digital servo actuators, and more particularly relates to servo-mechanisms for linearly positioning an output member by fluid means in response to selective input signals. This invention is a continuation of a prior application, Serial No. 153,076, filed November 17, 1961.

In the art of data processing, digital computers, machine-tools, automation, aircraft and rocket control systems, and the like, there exists a need for devices which accurately position a shaft or a movable reference output element in response to information applied to the input of the device. Various servo-mechanisms of this nature have been proposed; they may be actuated by electrical means or by purely mechanical means. It is an object of this invention to provide a servo actuator and output member positioner which is selectively operated by fluid pressure means. The fluid may be oil, water, compressed air, cold or hot gas, steam, or any other like fluid.

The transmission of control information in systems of the character herein mentioned is commonly carried out in the binary numerical system. Aircraft and rocket flight control systems often operate from the output of digital computers, programmers and reference systems supplying electrical control signals in the form of binary digital information. It is frequently desirable to convert the digital representation of the binary number into an analogue equivalent such as the linear position of a movable reference output member, an angular shaft rotation or the displacement of a flight control element. It is, therefore, another object of this invention to provide selectively operable fluid motor means for converting a binary information into an analogue equivalent in the form of an output shaft position. It is apparent to those skilled in the art that such an analogue linear displacement and positioning can be easily converted, in applications where so desired, into an angular shaft rotation and positioning through a simpler rocker arm assembly, rack and pinion assembly, or the like.

It is a further object of this invention to provide a compact, self-contained, fluid motor powered servo actuator.

It is an additional object of this invention to provide a servo actuator developing a great power with practically no lag in operation and almost instantaneous response.

A further object of this invention is to provide a powerful servo actuator which can move an output element to a predetermined number of discrete positions which are accurately repeatable ad infinitum, together with positive stopping at each discrete position.

Still a further object of this invention is to provide a servo actuator which has positive dampening of the acceleration and deceleration of the movable output member.

Another object of the invention, and perhaps its most important object, is to provide a servo mechanism that directly accepts parallel binary digital control information as input signals and which, without conversion by a digital to analogue translator and without the use of complicated auxiliary feedback device, positions an output as a function of the input signals.

A further object of the invention is to provide a servo actuator which is capable of operating an output to a predetermined number of discrete positions on both sides of a midposition or neutral position.

It is still another object of the invention to provide a servo actuator which positions an output to the ordered position rapidly, positively and without oscillatory hunting of the final position.

It is a further object of the invention to provide a digital linear positioner as the control element for a servo valve controlling in turn a slave booster cylinder, the three elements being constructed and interlinked in such a manner as to have the servo valve be progressively opened and closed so as to cause the piston of the slave booster cylinder to be displaced to the position requested by the control input signals without sudden acceleration and deceleration which could be damaging to the equipment connected to the output of the servo actuator.

An additional object of this invention is to provide a device which can utilize readily available pressure fluid hardware, tubings, valves, accumulators, and the like.

Another object is to provide a functional unit endowed with high reliability and long life.

Additional objects and advantages of the invention will become apparent from the following description and appended claims, taken in connection with the accompanying drawings which disclose, by way of example, the principle of the invention and some of the best modes which have been contemplated of applying that principle.

In the drawings:

FIGURE 1 is a top plan view of a digital servo actuator embodying the principle of the present invention;

FIGURE 2 is a side elevation view of the same, with some parts broken away to show the internal construction;

FIGURE 3 is an end view of the device of FIGURES 1-2, seen from line 3—3 of FIGURE 2, as viewed in the direction of the arrows;

FIGURE 4 is a longitudinal sectional view of the invention, seen from line 4—4 of FIGURE 3, as viewed in the direction of the arrows;

FIGURE 5 is a cross-sectional view, along line 5—5 of FIGURE 4, as viewed in the direction of the arrows;

FIGURE 6 is a partial longitudinal sectional view of another embodiment of the invention.

GENERAL DESCRIPTION

Figure 7:
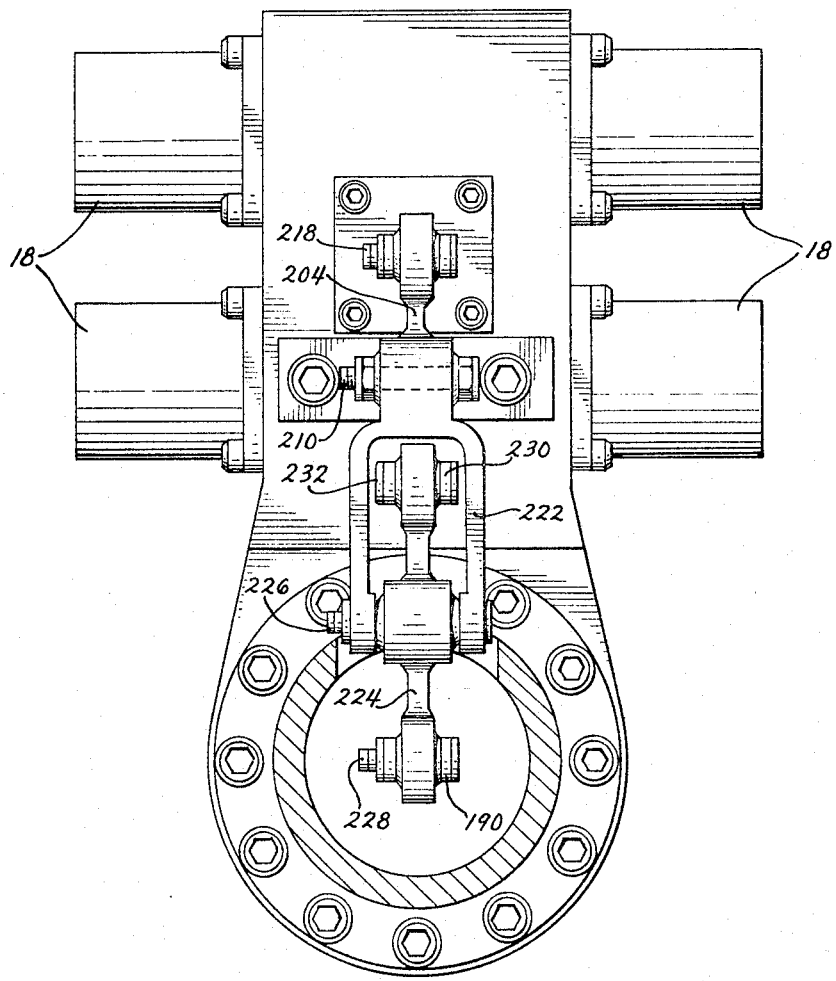
FIGURE 7 is a partial end view of the embodiment of FIGURE 6 as seen from line 7—7 of FIGURE 6.

Referring to FIGURES 1–5 of the drawings, and more particularly to FIGURES 1–2, the digital servo actuator of the invention consists of a digital linear positioner 10, a servo valve 12 and a servo booster cylinder 14. As will be hereinafter explained in more details, the output shaft 20 of the digital linear positioner actuates the servo valve 12 by means of a linkage arrangement, referred to generally by numeral 16, and direct feedback from the servo booster cylinder through the linkage arrangement 16 actuates the servo valve control rod 22 in order to bring the servo valve back to a closed position as soon as the output member 24 of the servo booster cylinder reaches the position ordered by the input control signals.

A plurality of control valves 18, energized by parallel input signals in a binary form, is used to selectively introduce and exhaust fluid under pressure into and from the stages of the digital linear actuator, as hereinafter explained in more details.

DIGITAL LINEAR POSITIONER

With reference to FIGURES 1–5, and more particularly with reference to FIGURE 4, the digital linear positioner, designated generally by numeral 10, and which embodies the same principle as disclosed in copending U.S. Patent application Serial No. 98,549, filed on March 27, 1961 by Jack M. Brandstadter, now Patent No. 3,141,388 consists of a housing 26 having a bore in which is disposed a sleeve 28 maintained on one end of the bore by end cap 30, and on the other end of the bore by a gland member 31, the end cap and the gland member being fastened to the housing by any conventional means. Within the bore of the sleeve 28, interlinked piston elements 32, 34, 36 . . . 50 are disposed end to end.

End cap 30 is provided with an integrally formed link 60 projecting a short distance into the bore and having a downturned, as seen in the drawing, end portion or flange 61. Piston elements 32 to 50 have a lap fit within the bore of sleeve 28 and are slidable therein. All the piston elements are similar in form and principle of operation, although their overall length dimensions vary according to a certain progression as hereinafter explained. Description of one piston element will then suffice and will apply to all the piston elements, with the exception of piston element 50 which is adapted to operate directly the output shaft 62 of the digital linear positioner.

Each piston element, such as 32 for example, has a first integrally formed L-shaped projecting extension or push rod 52 on one side, and a second integrally formed L-shaped projecting extension or connecting link 54 on the other side. The push rod 52 has a downturned, as shown in the drawing, end portion or flange 56 having a shoulder-like integral slide member 57 adapted to slidably bear upon the inner surface of the bore of sleeve 28. The end surface of the push rod element is adapted to abut against the side surface of the next piston element, for example on the side surface of piston element 34. Connecting link 54 of piston element 32 has an upturned, as seen in the drawing, end portion or flange 58 having also a shoulder-like slide element 59. The inner face of the upturned end portion or flange 58 is adapted to link with and abut against the inner face of the downturned end portion or flange 61 integral with the end cap 30. The inner face of the upturned flange element of the connecting link of the piston element 34 is adapted to link with and abut against the inner face of the downturned end portion or flange of the push rod 52 of piston element 32. By introducing fluid under pressure into chamber 64, by means to be hereinafter explained, piston element 32 is caused to be displaced to the left, as seen in the drawing, until the abutment face of its connecting link flange contacts the inner face of the end cap flange portion 61. The permissible travel or stroke of piston element 32 represents one unit of elementary linear displacement, and at the same time as piston element is displaced to the left, its push rod pushes piston element 34 of the same unit of elementary travel, which in turn is transmitted to the output shaft 62 from the chain of individual piston elements by means of their respective push rods. If fluid under pressure is introduced into chamber 66, piston elements 32 and 34 are forced apart. Piston element 32 is unable to move due to the presence of fluid pressure in chamber 64 and piston element 34 is displaced to the left until the abutment of its connecting link engages the abutment of the push rod of piston element 32. The permissible travel of piston element 34 is also limited to one unit of elementary displacement, and this travel is transmitted to the chain of pistons or stage elements in the same manner as hereinbefore explained.

Any stage which is already in an expanded state, or in other words, any stage consisting of two consecutive piston elements already forced apart by fluid under pressure being present in their common chamber, transmits integrally to the next following stage the motion received from the next preceding stage.

Consequently, by selectively admitting fluid under pressure into chambers 64, 66 . . . 82, and by selectively exhausting fluid from the said chambers, the output shaft 62 is capable of occupying selected discrete positions which correspond to the sum of the individual displacements of the piston members being energized. The progression of individual displacements is preferably in a series such as: 1:1:2:2:4:4:8:8: . . . $n$:$n$. In the preferred embodiment shown, one group of elements forming a binary series 1:2:4:8 . . . $n$ is normally in an expanded condition and another group forming a similar binary series is normally in a retracted condition, in the absence of input signals to the valves 18 controlling the admission and exhaust of fluid into and from chambers 64 to 82. Consequently the output shaft 62 occupies normally a midposition, such as condition being shown in FIGURE 4. With 5 pairs of indvididual stages in the digital linear positioner as illustrated in the drawing, the output shaft can be positioned to 31 discrete positions on both sides of the midposition or zero position.

Between the piston element 50 and the end gland 31 there is an annular chamber 84 open at all times by means of a passageway 86, a calibrated orifice 88 and a conduit 90 to a fluid pressure manifold 92. Fluid under pressure is thus allowed to act upon a reduced area of the left face, as seen in the drawing, of the piston element 50, supplying a biasing force solicitating the digital linear positioner to a retracted position. The calibrated orifice regulates the flow of fluid into annular chamber 84 and from the said chamber with a possibility of obtaining a predetermined response time for the displacement of the output shaft of the digital linear actuator in function of the size of the orifice.

It is evident that any number of pairs of motor stages can be used in the digital linear positioner 10, taking into consideration the number of discrete positions sought to be attained by the output shaft 62. For example, with 4 pairs of motor stages only, the number of discrete positions attainable by the output shaft 62 would be 15 positions on both sides of a mid-position or zero position. Conversely, with 7 pairs of motor stages, the number of discrete positions available at the output shaft would amount to 127 on both sides of the midposition or zero position.

It is also evident that the digital linear positioner needs not operate around a zero or neutral position. A positioner having individual displacement stages in a straight binary series may be used. The internal construction of the positioner herein shown and described is for illustration purposes only and it may be actually of any form whatsoever, such as are disclosed in the above mentioned copending application Serial No. 98,549 of Jack M. Brandstadter.

DIGITAL ACTUATOR VALVES

The input control signals, preferably in a parallel binary form, are fed to the solenoid operated valves 18, by means of electrical wires (not shown) leading into the multipin connector 114, FIGURE 1, for the purpose of actuating the valves in a selective manner. The valves preferably are disposed in such a way that, when the device is at rest, one half of the total number of the valves are in an open position and the other half are in a closed position, thereby admitting fluid under pressure to a half pair of the chambers of the digital linear positioner, and exhausting fluid from the other half pair of the chambers.

Each valve 18, such as valve 18–40 shown more clearly in FIGURE 5, consists of a housing 26 having a cover 116 enclosing an electric solenoid coil 117 disposed around a plunger 118 for control thereof. A bore disposed within the valve housing 26 contains a sleeve 128 within which is slidably disposed a hollow valve spool member 122. When energized by the solenoid coil 117, the plunger 118 displaces the valve spool 122 by action on a push rod element 120 integral with the spool, and a coil spring 126 disposed concentrically within the spool 122 returns it to the position indicated on the drawing, as soon as the plunger is no longer energized by the solenoid coil. In this position an annular chamber 128, defined by an undercut outer surface portion of the spool 122, is placed in communication by means of port 134 with a return fluid channel 136. Through passageways 132 and 104 the annular chamber 128 is at all times in communication with the chamber 72 of the digital positioner (FIGURE 4) and, with the valve spool 122 in the position indicated in the drawing at FIGURE 5, the valve connects chamber 72 to the return fluid channel 136, thereby allowing the piston elements 40 and 38 (FIGURE 4) to be as close to one another as permitted by the length of the push rod of piston element 38. When the solenoid coil 117 is energized, spool member 122 is displaced to the right, in reference to the view of FIGURE 5, and chamber 72 is connected to fluid pressure channel 92, via ports 132, annular chamber 128 and port 130. In this way, piston element 40 is forced to travel its permissible stroke, as limited by the abutment of its connecting link cooperating with the abutment of the push rod of piston element 38.

Valves 18–32 to 18–50 are alternately mounted in rows disposed on both sides of the housing 26 of the digital positioner, with valves 18–32, 18–36, 18–40, 18–44 and 18–48 adapted to place chambers 64, 68, 72, 76 and 80 in communication with fluid return manifold 136, and with valves 18–34, 18–38, 18–42, 18–46 and 18–50 adapted to place chambers 66, 70, 74, 78 and 82 in fluid communication with pressure fluid manifold 92 when no control signals operate the valve solenoid coils. In this manner the digital positioner output shaft 62 occupies a midposition or zero position, with the possibility of controlling it to occupy any discrete position on both sides of the zero position by selective energizing of the solenoid coils of the appropriate valve or valves.

SERVO VALVE AND BOOSTER CYLINDER

Referring once more to FIGURE 4, the digital actuator 10 is shown fastened by conventional means upon a housing 147 having a longitudinal bore 149 containing a sleeve 148 maintained by end glands 150 and 152 threaded on both ends of the bore 149. Slidably disposed within the internal bore of the sleeve 148 a valve spool member 154 presents three land portions 156, 158 and 160 defining annular chambers 168 and 170. Chamber 168 is at all times in communication with channel 172, via port 171, and chamber 170 is at all times in communication with channel 174, via port 173.

Two annular chambers 162 and 164, disposed respectively between end gland 150 and land 156 and between land 160 and gland 152, are at all times connected to a return fluid manifold 198 (FIGURE 5) by means of passageways such as 200, and another annular chamber 166 disposed around land 158 is at all times in communication with a pressure fluid manifold 194 by means of passageways such as 196.

The servo valve spool member 154 is normally in the central position shown in FIGURE 4. In this position, return fluid annular chambers 162 and 164 are disconnected from annular chambers 168 and 170, respectively, by lands 156 and 160 obturating ports 163 and 165 respectively. The pressure fluid annular chamber 166 is also cut off from annular chambers 168 and 170 by land 158 obturating ports 167 and 169.

If the servo valve control rod 22 is now pulled to the left as viewed in FIGURE 4, the valve spool member 154 is of course displaced to the left and annular chamber 170 is placed in communication with pressure fluid annular chamber 166. Fluid under pressure is thus directed to channel 174. At the same time, annular chamber 168 is placed in communication with return fluid annular chamber 162, thereby allowing fluid present in channel 172 to exhaust to return. If control rod 22, and consequently valve spool member 154, is displaced to the right, channel 174 is exhausted to return and channel 172 is connected to pressure. The servo valve control rod 22 is actuated by the combined actions of the output member 20 of the digital positioner 10 and the feedback motions originating from the booster cylinder, the said combined actions being applied to the control rod by way of the linkage arrangement 16, as hereinafter explained in more detail.

A second bore 175 is disposed within the housing 147 substantially parallel to the bore 149 of the valve assembly. This second bore is closed on both ends by end glands 176 and 178 fastened thereon and slidably admitting therethrough both ends of a piston rod 180.

A double-acting piston element 182, integral or fastened upon the piston rod 180, and supplied with piston rings 184, defines two annular chambers 186 and 188 into which fluid under pressure may be introduced, or from which fluid may be exhausted, by means of channel 172 leading into chamber 186 and channel 174 leading into chamber 188, respectively.

When channel 172 is connected to fluid pressure at the same time as channel 174 is connected to return under the control of valve spool member 154 as hereinbefore explained, the fluid under pressure introduced into chamber 186 exerts a force upon the double-acting piston 182 displacing it and the piston rod 180 to the right, as seen in the drawing. When fluid under pressure is introduced into chamber 188, at the same time as fluid is exhausted from chamber 186, the piston and piston rod are displaced to the left.

Any displacement of the piston rod 180 is integrally transmitted to the output member 24 (FIGURES 1–2) fastened to the end thereof. The output member 24 is thus positioned in relation to a stationary or ground reference member 202 integral with or fastened to the end gland hollow housing 176.

Furthermore, any displacement of the piston rod 180 is also integrally transmitted to a connecting rod 190 affixed to the opposite end of the piston rod by fastening means 192 best seen in FIGURE 4. The connecting rod 190 supplies a feedback which is applied, through the linkage arrangement 16, FIGURES 1–3, to the servo valve rod 22 in order to modify the action thereupon of the linear positioner in the manner and for the purpose hereinafter set forth.

LINKAGE ARRANGEMENT

The linkage arrangement designated generally by numeral 16 (FIGURES 1–3), and interconnecting the output member 20 of the digital linear positioner 10 with the servo valve control rod 22, comprises a first lever 204 projecting through openings 206 and 208 in the end gland housing 176. Lever 204 is supported by means of pivot pin 210 supported from brackets 212 and 214 integral with or fastened to the end gland housing 176. One end of lever 204 is connected to the output member 20 of the digital positioner 10 through a stirrup member 216 fastened to the lever by way of a pivot pin 218 and to the digital positioner output member by way of another pivot pin 220. The other end of lever 204 presents a fork-like or yoke portion 222 pivotally supporting within its bifurcation a whippletree lever member 224. The whippletree lever member 224 is capable of swinging motion around a pivot pin 226 affixed to the end of the yoke portion 222 of the lever 204. One end of the whippletree lever member is connected to the end of the feedback connecting rod 190 of the servo booster cylinder by means of a pivot pin 228, and the other end is connected to the control rod 22 of the servo valve by a stirrup member 230 supported between a pivot pin 232 on the whippletree lever member and a pivot pin 234 on the end of the servo valve control rod 22.

When the digital positioner output member 20 is displaced in response to control signals in a binary form activating the valves 18, the linear displacement of stirrup member 216 causes the lever 204 to swing around pivot 210. Assuming that the output member 20 is displaced to a position further to the left than the midposition shown on FIGURE 2, pivot 226 on the yoke end of lever 204 is swung to the right. The end of whippletree 224 bearing pivot 228 is prevented from moving by connecting rod 190. This forces the other end of whippletree 224 to swing to the right, as viewed in the drawing, driving the control rod 22 of the servo valve also to the right and consequently displacing the servo valve spool 154 to the right (FIGURE 4). Fluid pressure port 167 is thus placed in communication, via annular chamber 168, with the passageway 172, introducing fluid under pressure into the annular chamber 186 of the booster cylinder. At the same time, annular chamber 188 of the booster cylinder is opened to return chamber 164, via passageway 174, port 173, annular chamber 170 and port 165. The double-acting piston 182 is thus displaced to the right displacing in turn its output member 24 to the right (FIGURE 2). The displacement to the right of piston 182 displaces also the connecting rod 192 to the right, swinging to the right the end of whippletree lever 224 bearing pivot 228, and swinging to the left the end of the whippletree lever bearing pivot 232. This in turn causes the servo valve control rod 22 to be pulled to the left. It can be seen that as soon as the servo booster piston 182 reaches a predetermined position the servo valve will close as a result of the spool 154 reaching its midposition preventing further motion of the piston, and that the servo booster output member 24 will then occupy a position which is the analogue equivalent of the binary control signals reaching the control valves 18. The servo booster output member 24 reaches the ordered position smoothly and without hunting, under the progressive and precise closure of the servo valve as directed both by the position of the output member of the digital positioner and the progressive action of the feedback from connecting rod 190.

Furthermore, the digital positioner needs develop only the force necessary to actuate the servo valve control rod. The servo booster cylinder can be designed to exert at its output member any force that may be necessary to move and precisely position a load. It can be seen that the invention provides both an accurate positioning of the booster cylinder output member in response to input control signals and a power amplification of the force available at the output member of the digital linear actuator. By proportioning the distances separating the ends of the lever 204 and 224 from their respective pivots 210 and 226, the output member 24 of the servo cylinder may be caused to be displaced by the same amount as the output member 20 of the digital linear positioner. However, a displacement amplification or reduction may be effected where so desired, by appropriate proportioning of the said distances, or leverage ratios, as will be apparent to those skilled in the art. Lever 204 is shown in the drawings as having a leverage ratio substantially equal to 1 to 2 and whippletree lever 224 is shown as having a leverage ratio substantially equal to 1 to 1. Such a linkage arrangement provides a stroke or displacement amplification between the linear positioner and the booster cylinder output members in a ratio of 1 to 4.

MODIFICATION OF FIGURES 6-7

The principle underlying the modification of the invention shown in FIGURES 6-7 is the same as the principle explained in relation to the example of the invention of FIGURES 1-6, and similar reference numerals are employed to designate similar or equivalent elements.

In the modification of FIGURES 6-7, the servo valve is located between the digital linear positioner and the servo booster cylinder. The action of the linkage arrangement connecting the output member 20 of the digital positioner to the servo valve control rod 22, as modified by the feedback action from the connecting rod 190 of the servo booster position is the same as in the preceding example of embodiment of the invention, taking into consideration the fact that the whippletree lever 224 has its ends inverted due to the inverted relative positions of the servo valve and the servo booster cylinder.

When the output member 20 of the digital positioner, which in FIGURE 6 is shown in its midposition or zero position, is moved towards the left for example, as viewed in the drawing, the yoke end 222 of the lever 204 is moved to the right. Because the end of the whippletree lever 224 bearing the pivot 228 is prevented from moving by the connecting rod 190, the end of the whippletree lever bearing pivot 232 is moved to the right. The servo valve control rod 22 and consequently the valve spool member 154 are also displaced to the right. This action places booster cylinder annular chamber 186 in communication, via passageway 172 and valve annular chamber 168, with fluid pressure chamber 166. At the same time annular chamber 188 is connected to fluid return chamber 164 via passageway 174 and valve annular chamber 170. Double-acting piston member 182 is thus forced to move to the right, consequently moving output member 24 also to the right, and moving pivot pin 228 to the right under the pulling action of connecting rod 190. Whippletree lever 224 is thus swung back to a position that closes the servo valve, in the same manner as hereinbefore explained in relation to the embodiment of FIGURES 1-5.

The embodiment of FIGURES 6-7 is shown as incorporating fourteen control valves 18. The fourteen valves operate seven couples of stages in the digital positioner in such a way that 127 positions are available at the output member 20 on both sides of the midposition or zero position. It is obvious that the number of control valves 18 shown is for illustrative purpose only and that any number of valves could be used without departing from the spirit and scope of the invention.

In the course of the description of the invention no mention has been made of the many seals, O-rings and other leakage preventing elements which are illustrated in the drawings. It is evident that such leakage preventing elements are necessary in devices of the class of the invention to prevent leakage to the ambient or leakage from a high pressure portion to a low pressure portion, and it is obvious that such leakage preventing elements are well known in the art and form no part of the principle of the present invention.

The illustrated embodiments of the invention have been shown with a stationary booster cylinder housing and a movable output member. However, the output member could be maintained stationary and the housing could be allowed to move without departing from the spirit and scope of the invention.

It is also obvious that, for some special applications, the integrated actions of several digital positioners could be applied to the servo valve for control thereof, or the action of one or more digital positioners could be combined with and modified by a manual input before it is applied to the servo valve.

The above examples are given only for illustration purposes of a few of the possible combinations contemplated, and it will be apparent to those skilled in the art that there will be a great number of such possible combinations.

It is contemplated that various changes, additions and omissions of elements may be made in detail within the scope and spirit of the invention; and it is, therefore, to be understood that the invention is not to be limited to the specific details, examples and embodiments shown and described.

What is claimed as new is:

1. An apparatus for converting input electrical digital signals into corresponding mechanical linear displacements with power amplification, said apparatus comprising:
   a stationary housing defining a stationary reference element and having a first substantially cylindrical bore closed at one end and open at the other end;
   a slidable output member defining a first movable reference element which is movable through the open end of said housing;
   a plurality of cascaded motor stages slidably disposed end-to-end within said first bore intermediate the closed end of said bore and said output member, each of said motor stages comprising:
      a piston member having a body adapted to slidably fit within said first bore in the housing and having a first and a second L-shaped extensions projecting from the opposite faces of said body;

the first of said extensions being a push-rod element adapted to abut against the end face of the piston body immediately preceding, and the second of said extensions being a connecting link element having an end flange portion adapted to project into a corresponding recess of the push-rod element of the next consecutive piston member;

said end flange portion having its inner end defining an abutment for the inner end face of the recess in the push-rod element of the next consecutive piston member;

a substantially annular motor chamber disposed between each two consecutive piston member bodies;

conduit means to admit supply pressure fluid into said annular motor chamber thereby causing said piston body to be displaced, displacing at the same time the piston members between it and the output member by pushing against the push-rod of the next consecutive piston member;

stop means defined by the inner end face of the recess in the push-rod elements and the abutment of the flange portion of the connecting link elements;

the first connecting link element being an integral portion of the end plate closing the closed end of said first bore in the housing and the last piston member displacing directly said output member;

biasing means exerted upon said last piston member in a direction that tends to maintain the end face of the push rod of each piston member in contact with the corresponding end face of the next preceding piston body and the end face of the push-rod of the first piston member in contact with the inner face of said end plate, thereby biasing the output member to its retracted position;

a solenoid-operated valve for each of said motor stages, said valve comprising:
  a substantially cylindrical cavity with pressure, return and control ports in communication respectively with a pressure fluid channel, a return fluid channel, and control passageway at all times connected to the motor chamber of one of said motor stages;
  a spool member with two integral enlarged land portions slidable within said cylindrical cavity;
  a spring bias urging said spool member to one extreme position where said pressure ports are disconnected from and said return ports are connected to said control ports;
  a plunger member for displacing said spool member to another extreme position where said pressure ports are connected to and said return ports are disconnected from said control ports;
  and a solenoid coil actuating said plunger member when selectively energized by the appropriate input electrical digital signal;

a power amplifying servo booster cylinder comprising:
  a second cylindrical bore substantially parallel to said first bore and provided with end caps on both ends;
  a double-acting piston element slidably disposed in said second bore and defining a first and a second servo motor chamber on both faces of said piston;
  a first and a second fluid control channels leading respectively into said first and said second servo motor chambers;
  a servo output member integral with said double-acting piston element and defining a second movable reference element slidable through the end cap closing one end of said second bore;
  a feedback connecting rod affixed to said double-acting piston element and slidable through the end cap closing the other end of said bore;

a control rod actuated servo valve for operating said servo booster cylinder, said valve comprising:
  a third cylindrical bore in said housing, substantially parallel to said first and second bores, and having pressure ports, return ports and a first and a second sets of control ports connected respectively to said first and second control channels;
  a spool member slidably disposed in said third bore and having three integral enlarged land portions defining a first annular chamber in communication with said first set of control ports and a second annular chamber at all times in communication with said second set of control ports;
  said spool member being integral with said control rod and being capable of being positioned thereby to a first extreme position whereby said first annular chamber is open to return ports and said second annular chamber is open to pressure ports, to a second extreme position whereby said first annular chamber is open to pressure ports and said second annular chamber is open to return ports, and to a neutral position whereby said first and second annular chambers are cut off from said pressure and return ports by said lands;
  and whereby said spool member controls the direction and amount of displacement of said double-acting piston member of said servo booster cylinder by selective admission of pressure fluid on one side of said piston at the same time as fluid is being exhausted from the other side of said piston;

and a linkage arrangement comprising:
  a first lever pivoting on a pin affixed to said housing and having one end connected to the output member defining said first movable reference element and the other end of said first lever being free to swing;
  a second whippletree-like lever pivoting on the free end of said first lever, one end of said second lever being connected to said control rod of said servo valve and the other end being connected to the end of said feedback connecting rod;
  said linkage arrangement integrating the actions of the motions of said first movable reference element and of said feedback connecting rod upon the control rod of said servo valve such as to cause said servo valve to operate said power amplifying servo booster cylinder to displace said second movable reference element to a position which is the analogue of the position of said first movable reference element.

2. An apparatus as claimed in claim 1 wherein:
the stop means limiting the travel of the piston member of each motor stage within said first bore allows the piston member of each said motor stage to travel a distance which is twice the distance defined by the stop means limiting the travel of the piston member of the immediately preceding motor stage.

3. An apparatus as claimed in claim 1 wherein:
the stop means limiting the travel of the piston member of each motor stage within said first bore allows the piston member of each of said motor stages to travel a distance which is one half of the distance defined by the stop means limiting the travel of the piston member of the immediately preceding motor stage.

4. An apparatus as claimed in claim 1 wherein:
the means limiting the travel of the first piston member closest to the end plate closing the closed end of said first bore in the housing limits that travel to one unit of displacement;
the means limiting the travel of the second piston member limits that travel also to one unit of travel;
the means limiting the travel of the third piston member limits that travel to two units of travel;
the means limiting the travel of the fourth piston member limits that travel also to two units of travel;
the means limiting the travel of each subsequent piston member limits that piston member's travel alternately to twice the amount of possible travel of the next preceding piston member and to the amount of possible travel of the next preceding piston member;
the solenoid-operated valves are alternately disposed in order to connect every other consecutive annular motor chamber between piston members to pressure fluid, and every other consecutive annular motor chamber to return fluid with no electric signals in the solenoid coils;
whereby said first movable reference element and consequently said second movable reference element are caused to occupy a neutral midposition in the absence of input electrical signals.

5. An apparatus as claimed in claim 2 wherein:
the linear position of the first movable reference element in relation to the housing represents the analogue equivalent of a binary number, and the linear position of the second movable reference element is the equivalent of the linear position of said first movable reference element with power and amplitude amplifications.

6. An apparatus as claimed in claim 3 wherein:
the linear position of the first movable reference element in relation to the housing represents the analogue equivalent of a binary number, and the linear position of the second movable reference element is the equivalent of the linear position of said first movable reference element with power and amplitude amplifications.

7. An apparatus as claimed in claim 4 wherein:
the first movable reference element can occupy discrete positions on both sides of a neutral midposition which are the analogue equivalent of a binary number, and the second movable reference element can occupy discrete positions which are the equivalents of the positions of said first movable reference element with power and amplitude amplifications.

8. An apparatus for converting electrical digital signals into corresponding mechanical linear displacements with power and amplitude amplifications, said apparatus comprising:
linear positioning means having an output member positionable to any one of a predetermined number of discrete positions;
said means comprising a plurality of pairs of individual pressure responsive displacement motor means placed end to end within a common housing and which are each capable of being expanded to a predetermined position from a contracted position, the motion of each said individual motor means being integrally transmitted to the chain of individual motor means between each said individual motor means and said output member;
one pair of solenoid-operated valve means per each pair of said individual motor means, one solenoid-operated valve means of one said pair normally connecting one individual pressure responsive displacement motor means of one pair to a source of fluid under pressure whereby said motor means is expanded, and the other solenoid-operated valve means of said same pair normally exhausting fluid from the other individual pressure responsive displacement motor means of one pair, in the absence of input electrical digital signals;
the plurality of said pairs of solenoid-operated valve means being capable of selectively expanding the normally contracted individual pressure responsive displacement motor means and of selectively contracting the normally expanded individual pressure responsive displacement motor means upon actuation of the respective solenoids of said solenoid-operated valve means;
amplitude amplification means connecting the output member of said linear positioning means to said servo valve means for control thereof;
servo power amplification booster means responsive to control by said servo valve means and having a positionable output member and positional feedback means;
and linkage relay compensating means to cause said positional feedback means to operate said servo valve means to a position whereby said servo power amplification booster means ceases to be actuated as soon as its output member reaches a position which is the linear analogue of the input electrical digital signals, and wherein the output member of said servo power amplification booster means can occupy any one of a predetermined number of discrete positions on both sides of a midposition, said midposition corresponding to an absence of input electrical digital signals.

9. A servo actuator comprising in combination:
a fluid-actuated linear positioner having an output member displaceable to any one of a predetermined number of discrete positions under the action of individual stages capable of occupying a fully extended and a fully retracted position and whose incremental displacements are summed up at said output member;
a solenoid-operated valve per each said individual stage for introducing fluid under pressure into said individual stage for extension thereof and for exhausting fluid from same for retraction thereof, said valve means being actuated by electrical command signals;
a fluid-operated servo booster cylinder having a double-acting piston member dividing said cylinder into a first and a second power chamber;
said piston member being connected to an output member capable of linear motion and to a positional feedback connecting rod whose position corresponds to the position of said output member;
a control servo valve for selectively connecting either one of said power chambers to a source of fluid under pressure whilst exhausting fluid from the other of said power chambers, said control servo valve being capable of occupying a midposition where fluid is cut off from both said power chambers, a first variable position away from said midposition where said first power chamber is placed in communication with fluid under pressure thereby displacing said output member and said positional feedback connecting rod in one direction and a second variable position on the other side of said midposition where said second power chamber is placed in communication with fluid under pressure thereby displacing said output member and said positional feedback connecting rod in an opposite direction;
a first linkage member from the output member of said linear positioner for controlling said control servo valve to any one of its positions;
and a second linkage member dependent from said first linkage member for applying a corrective motion to said control servo valve in function of the displacement of said positional feedback connecting rod to cause said control servo valve to return to said midposition as soon as the output member of said servo booster cylinder reaches a position analogous to the position occupied by the output member of said linear positioner.

10. A servo actuator according to claim 9, wherein:
said first linkage member causes an amplitude amplification between the motions of the output member of said linear positioner and the output member of said servo booster cylinder.

11. A servo actuator according to claim 9, wherein:
said individual stages are arranged in pairs in said linear positioner with both units of a pair being capable of identical incremental displacements;
and one half of the total number of solenoid-operated valves are arranged to introduce fluid under pressure into one half of the pairs of individual stages whilst the other half of the total number of solenoid-operated valves are arranged to exhaust fluid from the other half of said pairs, in the absence of control signals;
whereby the output member of said linear positioner is caused to occupy a neutral midposition, in the absence of control signals.

12. A servo actuator comprising in combination:
fluid-actuated linear positioning means having an output member displaceable to any one of a predetermined number of discrete positions under the action of individual stage means whose incremental displacements are summed up at said output member;
solenoid-operated valve means for introducing fluid under pressure selectively into said individual stage means for operation thereof and for exhausting fluid from same, said valve means being actuated by electrical command signals;
fluid-operated servo booster means having an output member capable of linear motion and supplying a feedback force responsive to the position of said positionable output member;
servo valve means for connecting said servo booster means to a source of fluid under pressure to cause said output member to be moved, said servo valve means being capable of occupying a first position whereby said output member is moved in one direction, a second position whereby said output member is moved in the opposite direction and an intermediate third position whereby said output member is maintained motionless;
first linkage means from the output member of said linear positioning means for operating said servo valve means to any one of its operative positions;
and second linkage means dependent from said first linkage means for applying said feedback force to said servo valve means to cause it to return to said third intermediate position as soon as the output member of said servo booster means reaches a position analogous to the position occupied by the output member of said linear positioning means.

13. A servo actuator according to claim 12, wherein:
said individual stage means in said linear positioning means are arranged in pairs, each units of a pair being capable of identical incremental displacements;
and said solenoid-operated valve means are arranged to introduce fluid under pressure into one half of the pairs of individual stage means and to exhaust fluid from the other half of the pairs of individual stage means in said linear positioning means in the absence of control signals;
whereby the output member of said linear positioning means is caused to occupy a midposition.

14. A servo actuator according to claim 12, wherein:
said first linkage means causes an amplitude amplification between the motions of the output member of said linear positioning means and the output member of said servo booster means.

15. A servo actuator comprising in combination:
linear positioning means having an output member displaceable in answer to input control signals to any one of a predetermined number of discrete positions under the action of individual stage means whose incremental displacements are summed up at said output member;
control means for controlling the operation of each of said individual stage means according to a control command signal;
fluid-operated servo booster means having an output member capable of linear motion and supplying a feedback force responsive to the position of said positionable output member;
servo valve means for connecting said servo booster means to a source of fluid under pressure to cause said output member to be moved, said servo valve means being capable of occupying a first position whereby said output member is moved in one direction, a second position whereby said output member is moved in the opposite direction and an intermediate third position whereby said output member is maintained motionless;
first linkage means from the output member of said linear positioning means for operating said servo valve means to any one of its operative positions;
and second linkage means dependent from said first linkage means for applying said feedback force to said servo valve means to cause it to return to said third intermediate position as soon as the output member of said servo booster means reaches a position analogous to the position occupied by the output member of said linear positioning means.

16. A servo actuator according to claim 15, wherein:
said individual stage means in said linear positioning means are arranged in pairs, each units of a pair being capable of identical incremental displacements;
and one unit of each pair is normally extended while the other unit of each pair is normally retracted in the absence of input control signals;
whereby the output member of said linear positioning means is caused to occupy a midposition in the absence of input control signals.

17. A servo actuator according to claim 15, wherein:
said first linkage means cause an amplitude amplification between the motions of the output member of said linear positioning means and the output member of said servo booster means.

References Cited by the Examiner

UNITED STATES PATENTS

| | | | |
|---|---|---|---|
| 2,383,278 | 8/1945 | Stevens | 91—384 X |
| 2,931,340 | 4/1960 | White | 91—410 X |
| 3,141,388 | 7/1964 | Brandstadter | 91—167 X |

OTHER REFERENCES

International Business Machine Technical Disclosure Bulletin; vol. 1, number 4, December 1958; by P. A. Gilouich.

EDGAR W. GEOGHEGAN, *Primary Examiner.*

FRED E. ENGELTHALER, *Examiner.*

P. E. MASLOUSKY, *Assistant Examiner.*